(12) United States Patent
Huang et al.

(10) Patent No.: US 11,098,885 B1
(45) Date of Patent: Aug. 24, 2021

(54) LIGHTING APPARATUS

(71) Applicant: XIAMEN LEEDARSON LIGHTING CO., LTD, Fujian (CN)

(72) Inventors: Huiyong Huang, Fujian (CN); Zhenyu Tang, Fujian (CN); Shuxing Gao, Fujian (CN); Yongzhe Dong, Fujian (CN)

(73) Assignee: XIAMEN LEEDARSON LIGHTING CO., LTD, Xiamen (CN)

(*) Notice: Subject to any disclaimer, the term of this patent is extended or adjusted under 35 U.S.C. 154(b) by 0 days.

(21) Appl. No.: 17/009,751

(22) Filed: Sep. 1, 2020

(30) Foreign Application Priority Data

May 22, 2020 (CN) .......................... 202020883486.9

(51) Int. Cl.
| | | |
|---|---|---|
| *F21V 23/00* | (2015.01) | |
| *F21V 23/06* | (2006.01) | |
| *G03B 21/12* | (2006.01) | |
| *H01R 33/945* | (2006.01) | |
| *F21V 21/02* | (2006.01) | |
| *G03B 21/20* | (2006.01) | |
| *F21Y 115/10* | (2016.01) | |

(52) U.S. Cl.
CPC ............ *F21V 23/007* (2013.01); *F21V 21/02* (2013.01); *F21V 23/06* (2013.01); *G03B 21/12* (2013.01); *G03B 21/206* (2013.01); *H01R 33/9453* (2013.01); *F21Y 2115/10* (2016.08)

(58) Field of Classification Search
None
See application file for complete search history.

(56) References Cited

U.S. PATENT DOCUMENTS

2017/0082252 A1* 3/2017 Casement ............... F21S 8/061

* cited by examiner

*Primary Examiner* — Vip Patel
(74) *Attorney, Agent, or Firm* — Chun-Ming Shih; Lanway IPR Services

(57) ABSTRACT

A lighting apparatus includes a first light source, a first light housing, a second light source and a second light housing. The first light housing is for disposing the first light source to emit a first light from a first direction via a first light opening. The second light housing is for disposing the second light source to emit a second light from a surrounding lateral wall of the second light housing. An angle between the first light direction and a radial direction of the surrounding lateral wall is between 60 degrees to 150 degrees. An inner wall of the second housing is surrounding and fixed to a neck portion of the first light housing.

20 Claims, 15 Drawing Sheets

LIGHTING APPARATUS

FIELD

The present invention is related to a lighting apparatus, and more particularly related to a lighting apparatus to be installed in a cavity.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Downlight devices are popular in various places. Usually, people reserve an installation cavity of a ceiling. Junction boxes may be placed in the installation cavity first. Downlight devices are placed directly into the installation cavity or placed into the junction box.

A junction box provides wiring connection for connecting to an external power source, e.g. 110V/220V alternating current source. Although downlight devices are not new, people want more functions to be added.

Therefore, it is beneficial to find innovative designs on downlight devices and other lighting devices to provide more functions and flexibility.

SUMMARY

In some embodiments, a lighting apparatus including a first light source, a first light housing, a second light source and a second light housing.

The first light housing is for disposing the first light source to emit a first light from a first direction via a first light opening.

The second light housing is for disposing the second light source to emit a second light from a surrounding lateral wall of the second light housing. An angle between the first light direction and a radial direction of the surrounding lateral wall is between 60 degrees to 150 degrees. An inner wall of the second light housing is surrounding and fixed to a neck portion of the first light housing.

In some embodiments, the lighting apparatus may be a downlight device or other light products, like a ceiling light, a panel light, a light tube or a light bulb.

The lighting apparatus provides two light sources so as to provide flexible and variable combination on light effects and functions.

The first light source and the second light source are arranged to emit lights on different directions. The light directions mentioned here refer to a major light direction which occupies a majority of light, e.g. 60% or more.

A detector may be used for analyzing the main light paths for identify the light direction.

In some embodiments, the surrounding lateral wall of the second light housing may be placed on a circular ring shape structure or a polygonal ring shape structure. In such case, there is a geometrical center for the structures and the direction from the center to the surrounding lateral wall refer to the radial direction.

In some embodiments, the surrounding lateral wall may have a surface perpendicular to the first direction of the first light. In some other embodiments, the surrounding lateral wall may have a tilt angle, e.g. +30 to −30 degrees.

Lens or other guiding devices may be used to produce such tilt angles. In some embodiments, the second light source may be placed on a tilt platform for making such tilt arrangement.

In some embodiments, the second light housing is a ring shape structure with a central opening surrounding the neck portion of the first light housing.

The neck portion is a narrow part for the first light housing, e.g. a cup wall, which has a narrower diameter than a surface rim attached below the cup wall, forming a neck portion.

In some embodiments, the second light housing is fixed to an installation cavity and exposing an entrance to plug in the first light housing to fix the first light housing to the second light housing.

Such installation cavity may be prepared by designers of a house. The major body of the lighting apparatus is placed inside the installation cavity while exposing a bottom surface, like a surface rim of a downlight device, of the lighting apparatus downwardly facing to users.

In some embodiments, the second light housing is installed first to the installation cavity. The second light housing has an entrance, like an opening with plugging structure for fixing the first light housing.

Specifically, the second light housing is installed first, leaving a hole for plugging the first light housing. The first light housing may get structure and electrical connection from the second light housing.

In some embodiments, the first light source receives a power supply from a connection to the second light housing.

In some embodiments, the first light housing has a cup structure and a surface rim. A bottom side of the second light housing is attached to an inner side of the surface rim. The neck portion is on a lateral surface of the cup structure. The first light source is disposed inside the cup structure.

In some embodiments, the second light housing may include a ring cover. The ring cover and the inner side of the surface together form a container space for concealing the second light source.

In some embodiments, a driver container is disposed on a top cover of the cup structure. Multiple elastic fixing units are disposed between the cup structure and the driver box for fixing the first light housing to an installation cavity.

The driver container may be a plastic box with fixing structures to be positioned and fixed to be electrically connected to the first light source.

In some embodiments, the driver container has a socket for plugging a plug head of a connector wire. The connector wire has an Edison cap for connecting to an Edison socket for routing an external power to a driver of the driver container.

The plug head may be associated to a standard plug socket, e.g. an IDEAL shape connector that is common in the market.

However, unlike traditional IDEAL connectors, the embodiments used in the present invention may be modified to keep only a portion of the IDEAL connector.

Specifically, the driver container provides an interface compatible of inserting an IDEAL plug head but the inner structure may be modified to directly integrated with the driver container, e.g. the structure is directly integrated with a driver circuit board.

In some embodiments, a junction box is placed inside the installation cavity. The multiple elastic units engage an inner wall of the junction box.

In some embodiments, a junction box is installed to the installation cavity first.

The junction box provides safety function, e.g. preventing fire accident by using a metal enclosure enclosing the lighting apparatus.

There are multiple elastic units, like elastic clips, spring units or other elastic components are used for being deformed to enter the entrance of the junction box or the installation cavity and then recover shapes to keep the lighting apparatus in the junction box or in the installation cavity.

In some embodiments, a bottom edge of the junction box is fixed to a top side of the second light housing.

Specifically, the junction box and the second light housing may conceal a portion of the first light housing to prevent water or dust entering the first light housing.

This provides a reliable design while providing flexible configuration and variation to the lighting apparatus.

In some embodiments, the top side of the second light housing has a water proof layer.

The water proof layer may be a ring structure with elastic features. For example, a rubber band, a foam layer, or other material layer may be used. The water proof layer may be fixed to the top side of the second light housing, or fixed to the bottom edge of the junction box. The water proof layer may also be separated from the bottom edge of the junction and the top side for eh second light housing.

In some embodiments, there are multiple positioning grooves disposed on the neck portion of the first light housing. The second light housing has corresponding multiple hooks for fixing to the multiple positioning grooves to fix the second light housing to the first light housing.

In some embodiments, there may be one groove to be plugged by the hooks of the second light housing.

In some embodiments, the hooks or protruding blocks may be formed on the first light housing while the installation grooves or slots are placed on the second light housing to fix the first light housing and the second light housing.

In some embodiments, the second light projects an image pattern on a ceiling.

For example, the image pattern may include, but is not limited to, geometrical shapes of one or multiple varying colors.

In some embodiments, the image pattern is a sky with stars.

The second light source may be operated separately from the first light source.

In some embodiments, the second light source provides weak and soft light, which is particularly great when the first light source is turned off at night time.

In such case, the second light source may project a sky with stars image pattern on a ceiling, which provides impressive visual effect with a simple architecture design without adding much cost.

In some embodiments, the second light housing is detachably connected to the first light housing with a plugging structure.

The plugging structure may be various forms of a pair of plugging structures respectively disposed on the first light housing and the second light housing.

For example, a male plug may be disposed on the first light housing and a female socket may be disposed on the second light housing. The male plug and the female socket together form a plugging structure.

In some embodiments, the plugging structure provides a structure connection between the first light housing and the second light housing and provides an electrical connection of the second light source to a driver fixed to the first light housing.

Specifically, electrodes may be disposed on connection positions for the components of the two light housing are electrically connected.

In some embodiments, the first light housing may route an external power to the second light housing.

A driver fixed to the first light housing may convert the external power to a direct current supplying to the components in the second light housing.

In some embodiments, the second light housing may have a battery for providing power to the components of the first light housing.

Other configuration may be applied to add more flexibility and convenience on the final design.

In some embodiments, when the second light housing is detached from the first light housing, a speaker module having a similar structure as the second light housing is attached to the first light housing with the plugging structure.

The similar structure mentioned here refer to the same connection structure that is capable of connecting the speaker module to the first light housing with the same way as the second light housing.

The connection may provide both structural and electrical connection to the speaker module.

When the lighting apparatus is placed on a ceiling, it is a convenient place to place a camera module.

The camera module may have multiple cameras facing to 360 degrees environment to completely capture necessary information for security or for protecting elders or children in the room.

surrounding areas to provide security monitoring for protecting elders or preventing thieves.

In some embodiments, the second light source is controlled to deliver a visual message by a light pattern emitted by the second light source.

For example, the visual message may be a different color of light emitted from the second light source.

In some embodiments, the visual message may be a special on and off light pattern. Different light patterns may be associated with different messages.

The driver of the lighting apparatus may be configured to be wireless connected to an external device like a door bell or a video phone. At such case, the visual message is particularly for helping people who cannot hear sounds.

In some embodiments, the first light housing has a cone structure surrounding the first light source for diffusing the first light of the first light source.

In some embodiments, people do not like to see glare form the lighting apparatus.

To achieve such purpose, a cone structure filled with dark color layers or protruding structures may be used for diffusing the light of the first light source to achieve the anti-glare function.

The cone structure may look like a reflective cup, but may be painted or attached with a dark color layer for absorbing a portion of the light to prevent glare effect that makes people uncomfortable when seeing the light directly with their eyes.

Some protruding bars or concave grooves may be applied on the inner side of the cone structure.

In some embodiments, the first light source has a condensing lens for condensing the first light of the first light source.

In some embodiments, the first light source may have a condensing lens for decreasing a light beam angle of the first light source.

This may also help decreasing preventing glare to be seen in multiple positions below the lighting apparatus.

For example, the light emitted from the first light source is originally distributed mainly over 120 degree range. By using the lens, the light of the first light source is condensed during moving to a 60 degree light beam. Such condensed path ensures the light beam moving outside the lighting apparatus with a more condensing way, instead of making users uncomfortable by seeing a portion of the light directly with eyes.

In some embodiments, there are multiple connection angles between the first light housing and the second light housing. Each connection angle corresponding to a different setting for controlling the first light source and the second light source.

Specifically, when the second light housing is a ring shape structure as illustrated in embodiments mentioned here, the ring shape structure may be rotated by a user with respect to the first light housing.

Different rotation angles may refer to different settings.

For example, a 30-degree rotated may refer to a first color temperature, and a 60-degree may refer to a second color temperature.

The configuration may be performed by providing a rotating structure between the second light housing and the first light housing.

In some embodiments, there may be several positioning structures prepared so that users may selection one of the positions to insert or to fix the first light housing to the second light housing.

The relative angle between the first light housing and the second light housing may be converted to a mechanical or an electronic message received by a driver of the lighting apparatus.

The driver controls the first light source and the second light source to operate corresponding to the relative angle between the first light housing and the second light housing.

DETAILED DESCRIPTION

Figure 11:
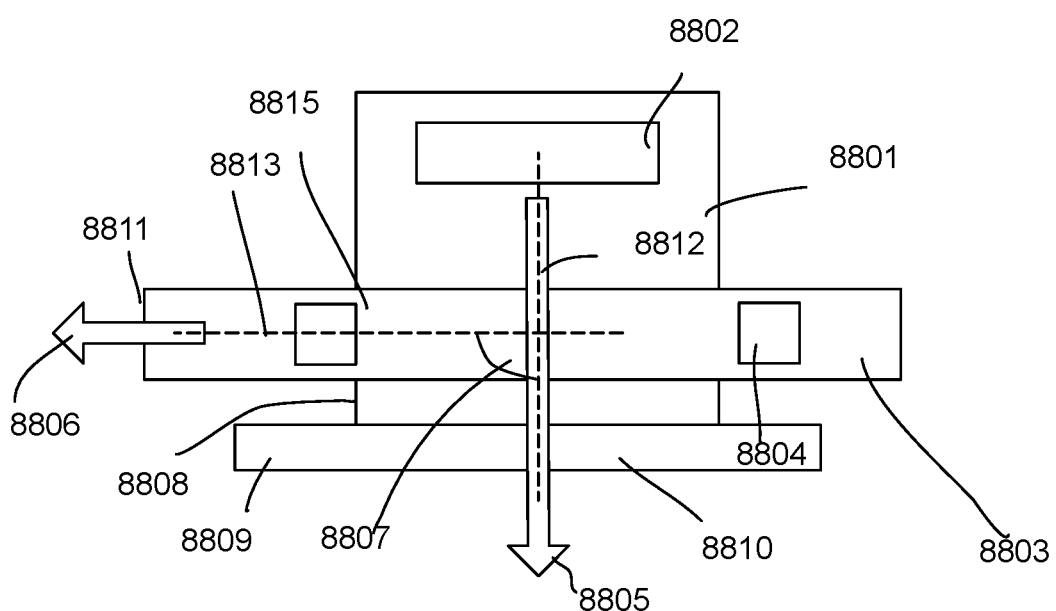
FIG. 11 shows an embodiment of a lighting apparatus.

Please refer to FIG. 11. In FIG. 11, a lighting apparatus including a first light source 8802, a first light housing 8801, a second light source 8804 and a second light housing 8803.

The first light housing 8801 is for disposing the first light source 8802 to emit a first light from a first direction 8805 via a first light opening 8810.

The second light housing 8803 is for disposing the second light source 8804 to emit a second light 8806 from a surrounding lateral wall 8811 of the second light housing 8803. An angle 8807 between the first light direction 8812 and a radial direction 8813 of the surrounding lateral wall 8806 is between 60 degrees to 150 degrees. An inner wall 8815 of the second light housing 8803 is surrounding and fixed to a neck portion 8808 of the first light housing 8801.

In some embodiments, the lighting apparatus may be a downlight device or other light products, like a ceiling light, a panel light, a light tube or a light bulb.

The lighting apparatus provides two light sources so as to provide flexible and variable combination on light effects and functions.

The first light source and the second light source are arranged to emit lights on different directions. The light directions mentioned here refer to a major light direction which occupies a majority of light, e.g. 60% or more.

A detector may be used for analyzing the main light paths for identify the light direction. Persons of ordinary skill in the art would know how to implement a light device to emit light via a major light direction, e.g. by disposing LED modules for emitting a light with light angle within a 120-degrees range for 80% of light output.

In some embodiments, the surrounding lateral wall of the second light housing may be placed on a circular ring shape structure or a polygonal ring shape structure. In such case, there is a geometrical center for the structures and the direction from the center to the surrounding lateral wall refer to the radial direction. In following drawings, such features are more clearly illustrated, e.g. the example in FIG. 4.

In some embodiments, the surrounding lateral wall may have a surface perpendicular to the first direction of the first light. In some other embodiments, the surrounding lateral wall may have a tilt angle, e.g. +30 to −30 degrees.

Figure 15:
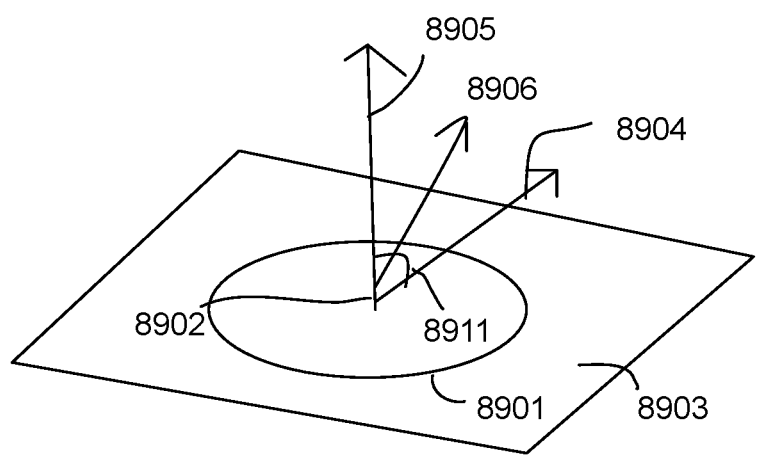
FIG. 15 shows a surface and angle relation.

Please refer to FIG. 15, which illustrates an example of a radial direction and related angle mentioned above.

In FIG. 15, a lateral wall of the second light housing is arranged on a circle 8901. There is a center 8902 for the circle 8901. The circle is at a surface 8903, forming a relative angle 8911 with the first light direction 8905. The angle may be 90 degrees or to say substantially perpendicular to the surface 8903 in some embodiments.

In some other embodiments, there is a tilt angle for the second light. For example, the light direction 8906 may appear in another embodiment showing a tilt angle compared with perpendicular angle of the direction 8904 of the second light.

Figure 16:
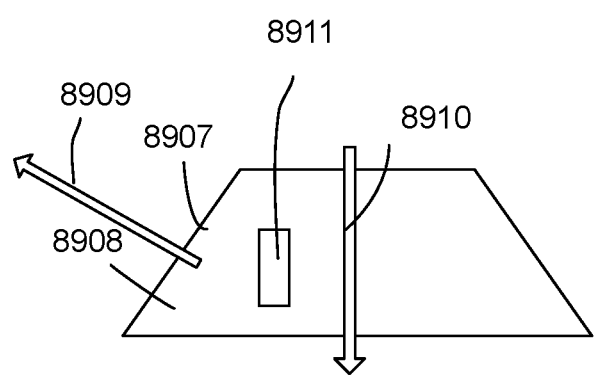
FIG. 16 shows another example with a tilt light output.

FIG. 16 shows a tilt surface 8907 of the second light housing, which causes a tilt second light direction 8909 of the second light with a tilt angle 8908. The range may be defined within 60 to 120 degrees between the second light direction 8909 and the first light direction 8910.

Lens 8911 or other guiding devices may be used to produce such tilt angles. In some embodiments, the second light source may be placed on a tilt platform for making such tilt arrangement.

In some embodiments, the second light housing is a ring shape structure with a central opening surrounding the neck portion of the first light housing.

In FIG. 11, the neck portion 8808 is a narrow part for the first light housing 8801, e.g. a cup wall, which has a narrower diameter than a surface rim 8809 attached below the cup wall, forming a neck portion 8808.

Figure 13:
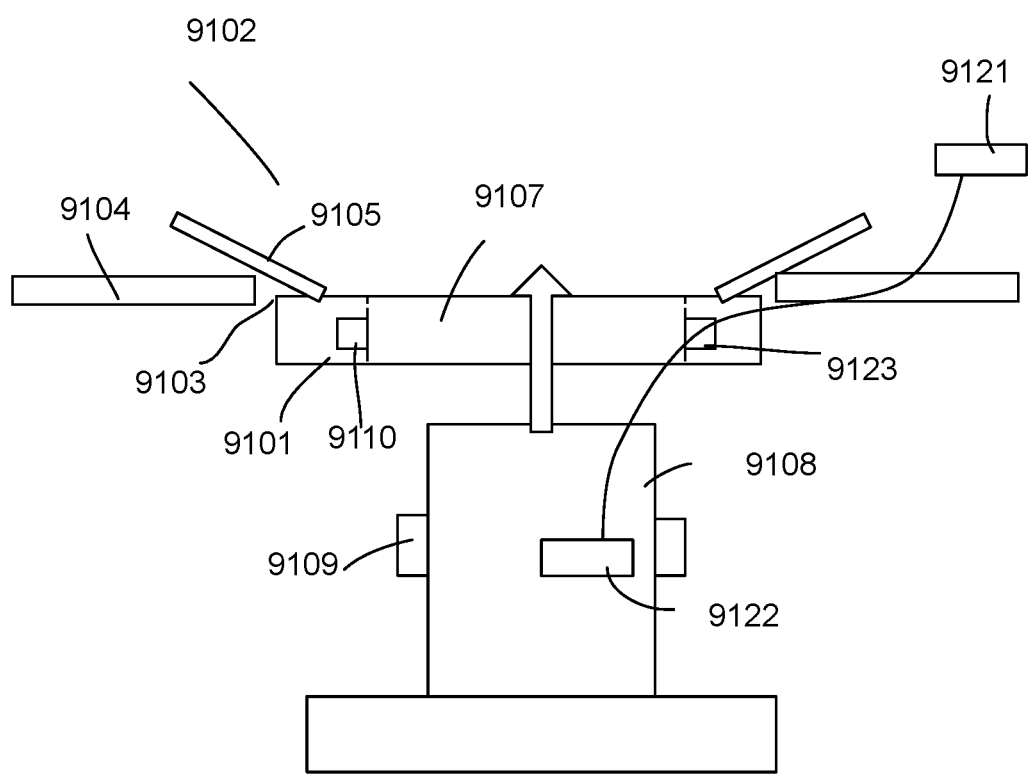
FIG. 13 shows another way to install the first light housing and the second light housing.

In FIG. 13, the second light housing 9101 is fixed to an installation cavity 9102. For example, the ceiling 9103 has an opening 9103 for installing the second light housing with elastic levers 9105.

The second light housing 9101 has an entrance 9107 to plug in the first light housing 9108 to fix the first light housing 9108 to the second light housing 9101.

Plugging structures 9109, 9110 may be attached to the first light housing and the second light housing respectively for providing a plug connection between the two components.

Such installation cavity may be prepared by designers of a house. The major body of the lighting apparatus is placed inside the installation cavity while exposing a bottom surface, like a surface rim of a downlight device, of the lighting apparatus downwardly facing to users.

In some embodiments, the second light housing is installed first to the installation cavity. The second light housing has an entrance, like an opening with plugging structure, e.g. the plugging structures 9109, 9110 in FIG. 13 for fixing the first light housing.

Specifically, the second light housing is installed first, leaving a hole for plugging the first light housing. The first light housing may get structure and electrical connection from the second light housing.

In some embodiments, the first light source receives a power supply from a connection to the second light housing.

In FIG. 13, an external power 9121 is routed via an electrode or a conductive path 123 to a light source or other component 9122 in the first light housing.

Figure 12:
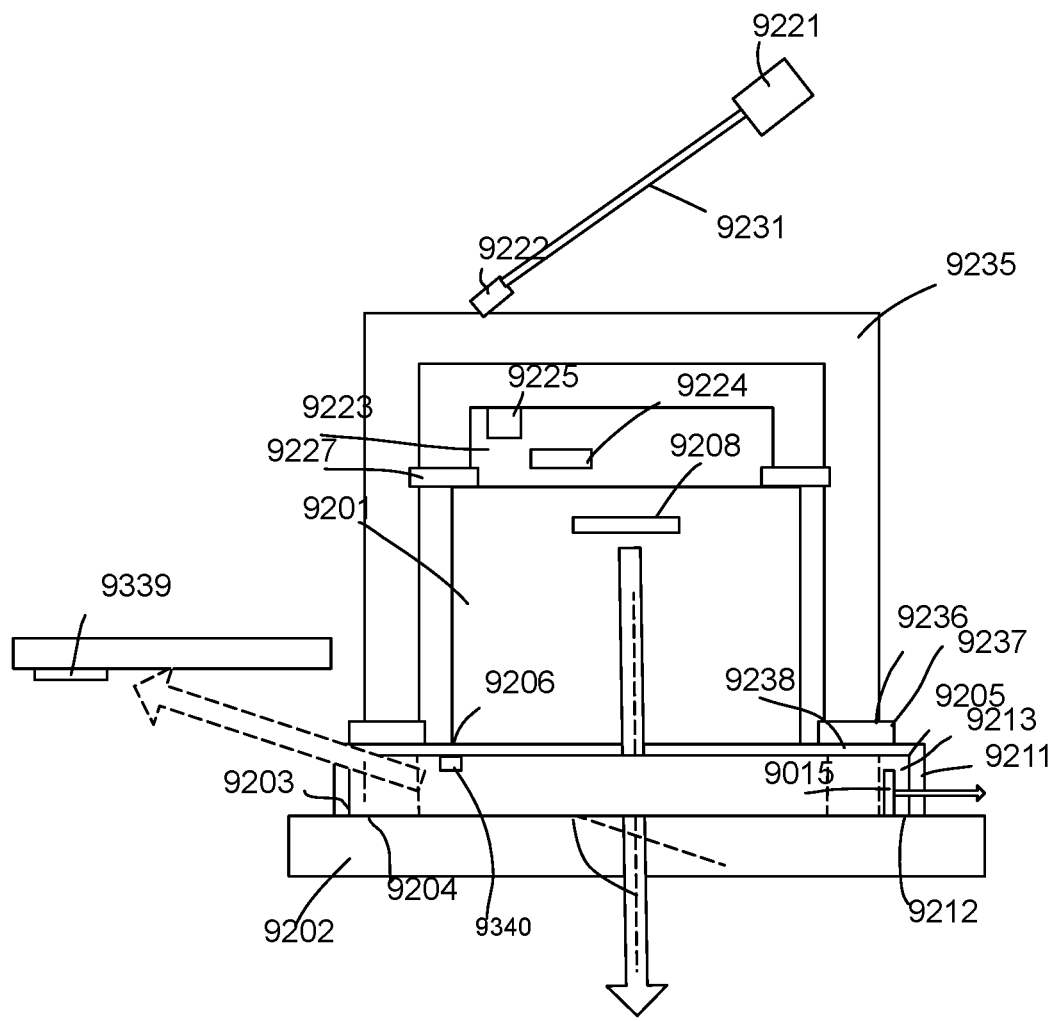
FIG. 12 shows a detail example how components are assembled and related.

In FIG. 12, the first light housing has a cup structure 9201 and a surface rim 9202. A bottom side 9203 of the second light housing 9205 is attached to an inner side 9204 of the surface rim 9204. The neck portion 9206 is on a lateral surface of the cup structure 9201. The first light source 9208 is disposed inside the cup structure 9201.

In some embodiments, the second light housing may include a ring cover 9211. The ring cover 9211 and the inner side 9212 of the surface rim 9202 of the second light housing together form a container space 9213 for concealing the second light source 9215.

In FIG. 12, a driver container 9223 is disposed on a top cover of the cup structure 9201. Multiple elastic fixing units 9227 are disposed between the cup structure 9201 and the driver container 9223 for fixing the first light housing to an installation cavity.

The driver container which encloses a driver 9224 for controlling the light sources may be a plastic box with fixing structures to be positioned and fixed to be electrically connected to the first light source.

In some embodiments, the driver container 9223 has a socket 9225 for plugging a plug head 9222 of a connector wire 9231. The connector wire 9231 has an Edison cap 9221 for connecting to an Edison socket (not shown, installed on an installation platform) for routing an external power to a driver of the driver container.

The plug head may be associated to a standard plug socket, e.g. an IDEAL shape connector that is common in the market.

However, unlike traditional IDEAL connectors, the embodiments used in the present invention may be modified to keep only a portion of the IDEAL connector.

Specifically, the driver container provides an interface compatible of inserting an IDEAL plug head but the inner structure may be modified to directly integrated with the driver container, e.g. the structure is directly integrated with a driver circuit board.

In FIG. 12, a junction box 9235 is placed inside the installation cavity. The multiple elastic units engage an inner wall of the junction box 9235.

In some embodiments, a junction box is installed to the installation cavity first.

The junction box provides safety function, e.g. preventing fire accident by using a metal enclosure enclosing the lighting apparatus.

There are multiple elastic units, like elastic clips, spring units or other elastic components are used for being deformed to enter the entrance of the junction box or the installation cavity and then recover shapes to keep the lighting apparatus in the junction box or in the installation cavity.

In some embodiments, a bottom edge 9236 of the junction box is fixed to a top side 9238 of the second light housing.

Specifically, the junction box and the second light housing may conceal a portion of the first light housing to prevent water or dust entering the first light housing.

This provides a reliable design while providing flexible configuration and variation to the lighting apparatus.

In some embodiments, the top side of the second light housing has a water proof layer 9237.

The water proof layer 9237 may be a ring structure with elastic features. For example, a rubber band, a foam layer, or other material layer may be used. The water proof layer may be fixed to the top side of the second light housing, or fixed to the bottom edge of the junction box. The water proof layer may also be separated from the bottom edge of the junction and the top side for eh second light housing.

Figure 1:
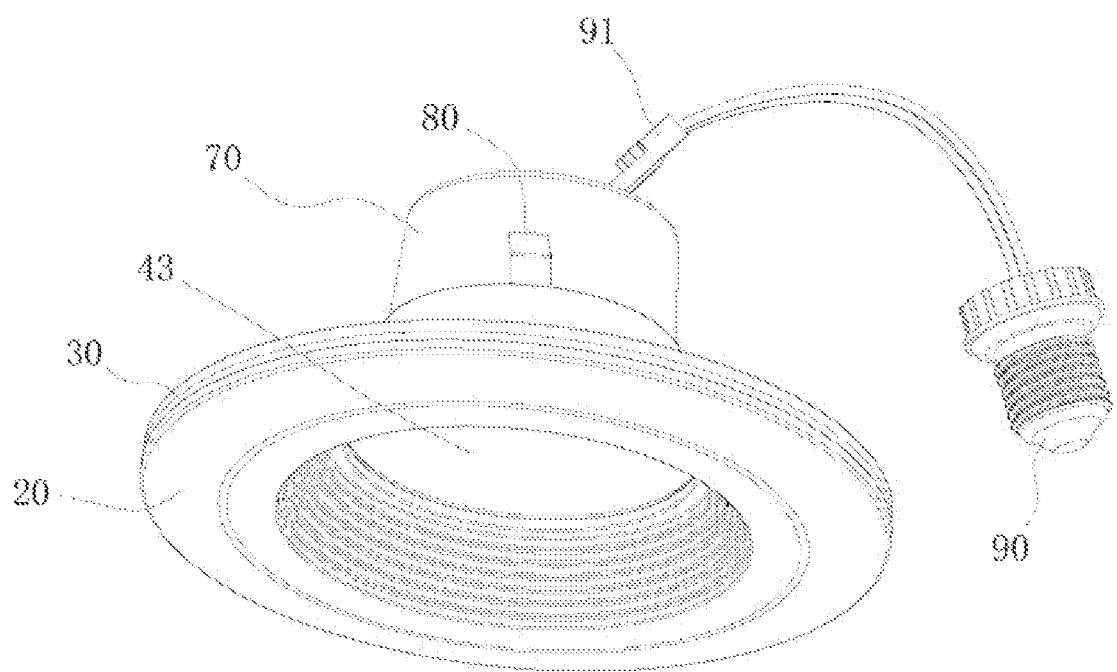
FIG. 1 illustrates a lighting apparatus with a connection wire.
Figure 2:
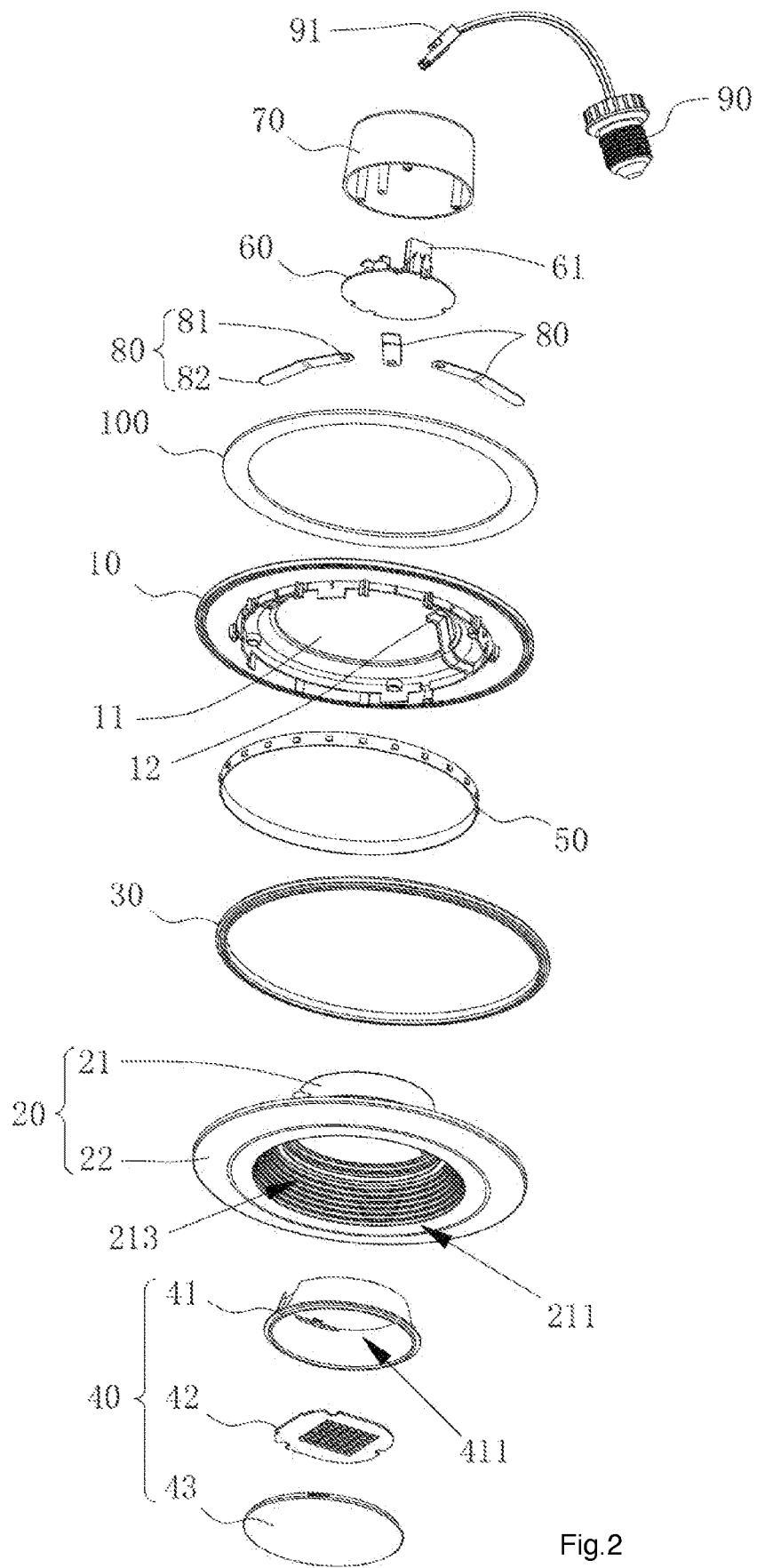
FIG. 2 illustrates an exploded view of the embodiment of FIG. 1.
Figure 3:
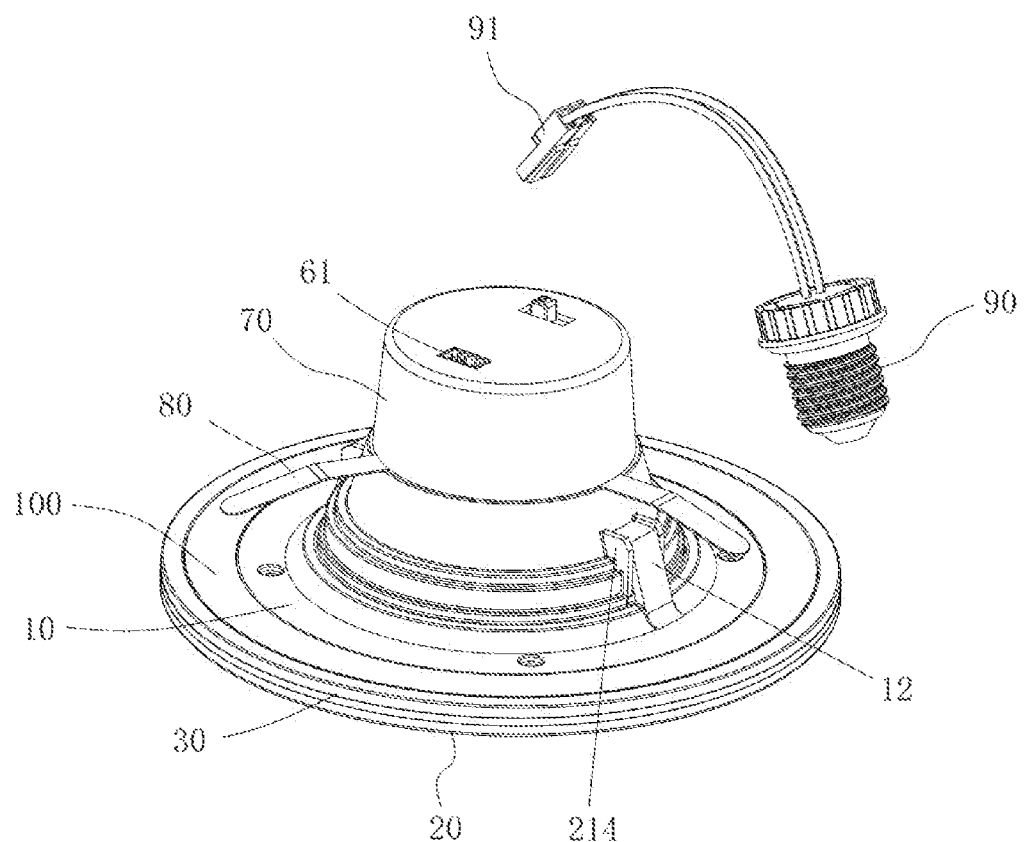
FIG. 3 illustrates another view of the lighting apparatus embodiment.

In FIG. 3, there are multiple positioning grooves 214 disposed on the neck portion of the first light housing. The second light housing has corresponding multiple hooks 12 for fixing to the multiple positioning grooves to fix the second light housing to the first light housing.

In some embodiments, there may be one groove to be plugged by the hooks of the second light housing.

In some embodiments, the hooks or protruding blocks may be formed on the first light housing while the installation grooves or slots are placed on the second light housing to fix the first light housing and the second light housing.

In FIG. 12, the second light projects an image pattern 9339 on a ceiling.

For example, the image pattern may include, but is not limited to, geometrical shapes of one or multiple varying colors.

In some embodiments, the image pattern is a sky with stars. This is particularly charming for in addition to a main lamination function, people can enjoy the star sky in the night with the second light source projecting the images.

The second light source may be operated separately from the first light source.

In some embodiments, the second light source provides weak and soft light, which is particularly great when the first light source is turned off at night time.

In such case, the second light source may project a sky with stars image pattern on a ceiling, which provides impressive visual effect with a simple architecture design without adding much cost.

In FIG. 12, the second light housing is detachably connected to the first light housing with a plugging structure 9340.

The plugging structure may be various forms of a pair of plugging structures respectively disposed on the first light housing and the second light housing.

For example, a male plug may be disposed on the first light housing and a female socket may be disposed on the second light housing. The male plug and the female socket together form a plugging structure.

In some embodiments, the plugging structure provides a structure connection between the first light housing and the second light housing and provides an electrical connection of the second light source to a driver fixed to the first light housing.

Specifically, electrodes may be disposed on connection positions for the components of the two light housing are electrically connected.

In some embodiments, the first light housing may route an external power to the second light housing.

A driver fixed to the first light housing may convert the external power to a direct current supplying to the components in the second light housing.

In some embodiments, the second light housing may have a battery for providing power to the components of the first light housing.

Other configuration may be applied to add more flexibility and convenience on the final design.

Figure 14:
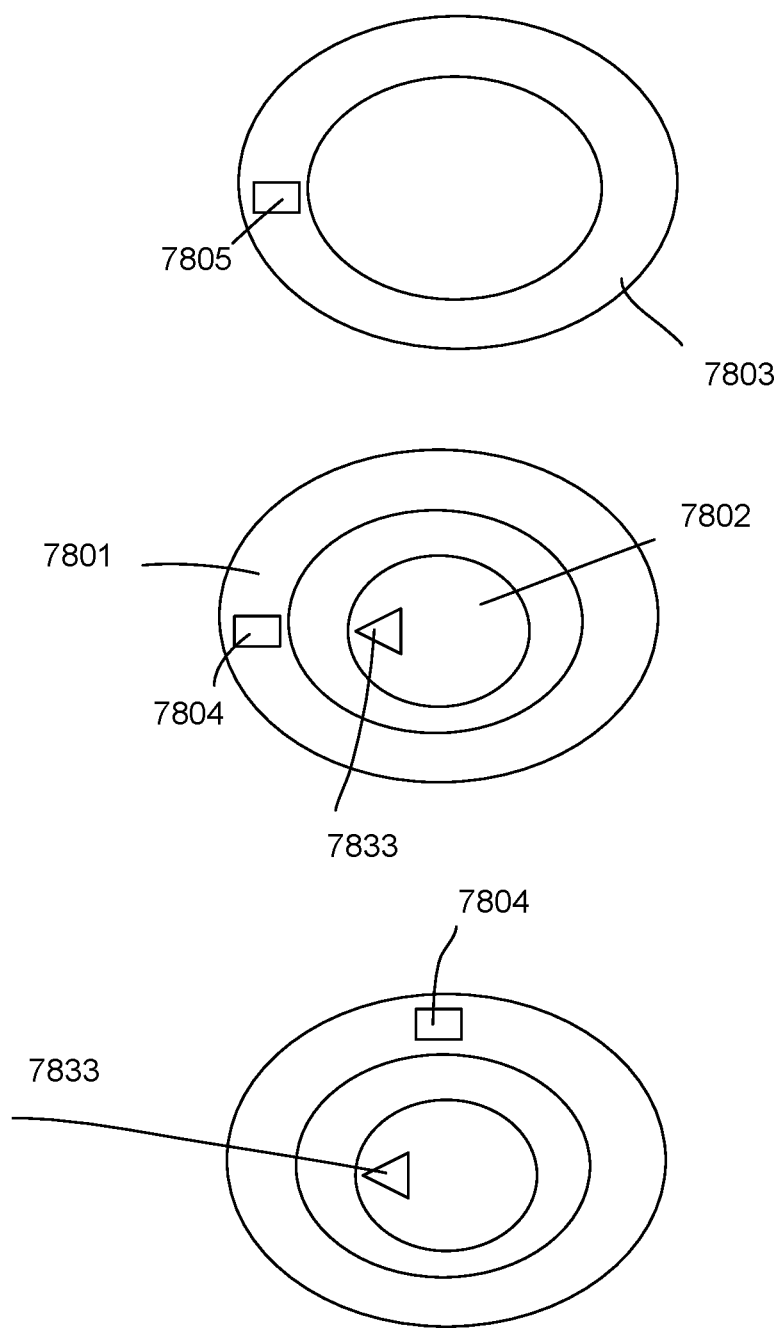
FIG. 14 shows how to configure a setting by positioning the first light housing and the second light housing.

In FIG. 14, when the second light housing 7801 is detached from the first light housing 7802, a speaker module 7803 having a similar structure, which means compatible to be installed or attached to, as the second light housing 7801 is attached to the first light housing 7802 with the plugging structure 7805, 7804.

The similar structure mentioned here refer to the same connection structure that is capable of connecting the speaker module to the first light housing with the same way as the second light housing.

The connection may provide both structural and electrical connection to the speaker module.

When the lighting apparatus is placed on a ceiling, it is a convenient place to place a camera module.

The camera module may have multiple cameras facing to 360 degrees environment to completely capture necessary information for security or for protecting elders or children in the room.

surrounding areas to provide security monitoring for protecting elders or preventing thieves.

In some embodiments, the second light source is controlled to deliver a visual message by a light pattern emitted by the second light source.

For example, the visual message may be a different color of light emitted from the second light source.

In some embodiments, the visual message may be a special on and off light pattern. Different light patterns may be associated with different messages.

The driver of the lighting apparatus may be configured to be wireless connected to an external device like a door bell or a video phone. At such case, the visual message is particularly for helping people who cannot hear sounds.

In some embodiments, the first light housing has a cone structure surrounding the first light source for diffusing the first light of the first light source.

In some embodiments, people do not like to see glare form the lighting apparatus.

To achieve such purpose, a cone structure filled with dark color layers or protruding structures may be used for diffusing the light of the first light source to achieve the anti-glare function.

The cone structure may look like a reflective cup, but may be painted or attached with a dark color layer for absorbing a portion of the light to prevent glare effect that makes people uncomfortable when seeing the light directly with their eyes.

Some protruding bars or concave grooves may be applied on the inner side of the cone structure.

In some embodiments, the first light source has a condensing lens for condensing the first light of the first light source.

In some embodiments, the first light source may have a condensing lens for decreasing a light beam angle of the first light source.

This may also help decreasing preventing glare to be seen in multiple positions below the lighting apparatus.

For example, the light emitted from the first light source is originally distributed mainly over 120 degree range. By using the lens, the light of the first light source is condensed during moving to a 60 degree light beam. Such condensed path ensures the light beam moving outside the lighting apparatus with a more condensing way, instead of making users uncomfortable by seeing a portion of the light directly with eyes.

For example, the two below drawings in FIG. 14 show two rotation angles between a mark 7833 and the plugging structure 7804, corresponding to two different settings.

In some embodiments, there are multiple connection angles between the first light housing and the second light housing. Each connection angle corresponding to a different setting for controlling the first light source and the second light source.

Specifically, when the second light housing is a ring shape structure as illustrated in embodiments mentioned here, the ring shape structure may be rotated by a user with respect to the first light housing.

Different rotation angles may refer to different settings.

For example, a 30-degree rotated may refer to a first color temperature, and a 60-degree may refer to a second color temperature.

The configuration may be performed by providing a rotating structure between the second light housing and the first light housing.

In some embodiments, there may be several positioning structures prepared so that users may selection one of the positions to insert or to fix the first light housing to the second light housing.

The relative angle between the first light housing and the second light housing may be converted to a mechanical or an electronic message received by a driver of the lighting apparatus.

The driver controls the first light source and the second light source to operate corresponding to the relative angle between the first light housing and the second light housing.

Please refer to FIG. 1 to FIG. 4, which illustrate a more clear example for explaining the concept of the embodiments.

Figure 9:
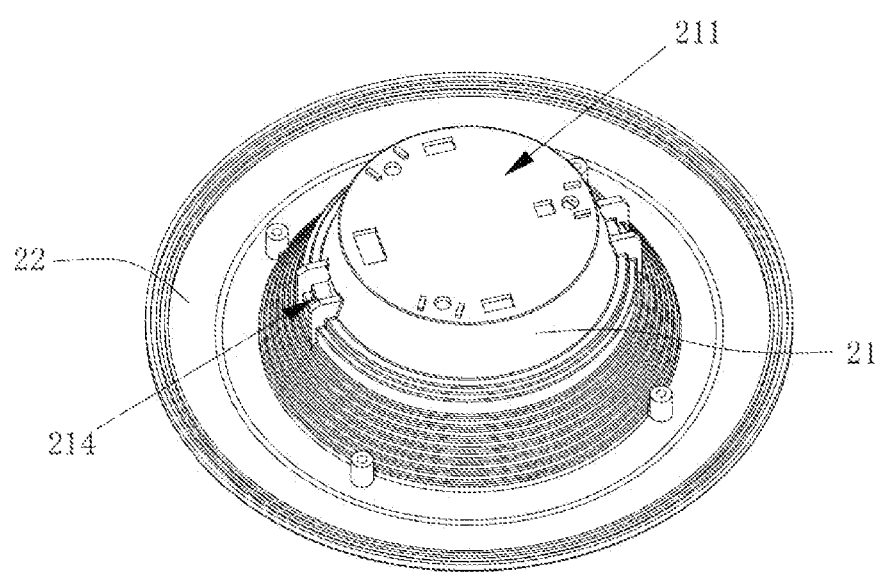
FIG. 9 illustrates a perspective view of the downlight apparatus.

In FIG. 9, a connector wire has an Edison cap 90 and an IDEAL connector head 91 as a plugging head.

There are elastic units 80 disposed between a driver box 70 and the first light housing. The first light housing has a light passing cover 43. The second light housing has a light passing cover 30. The first light housing has a surface rim 20.

Figure 10:
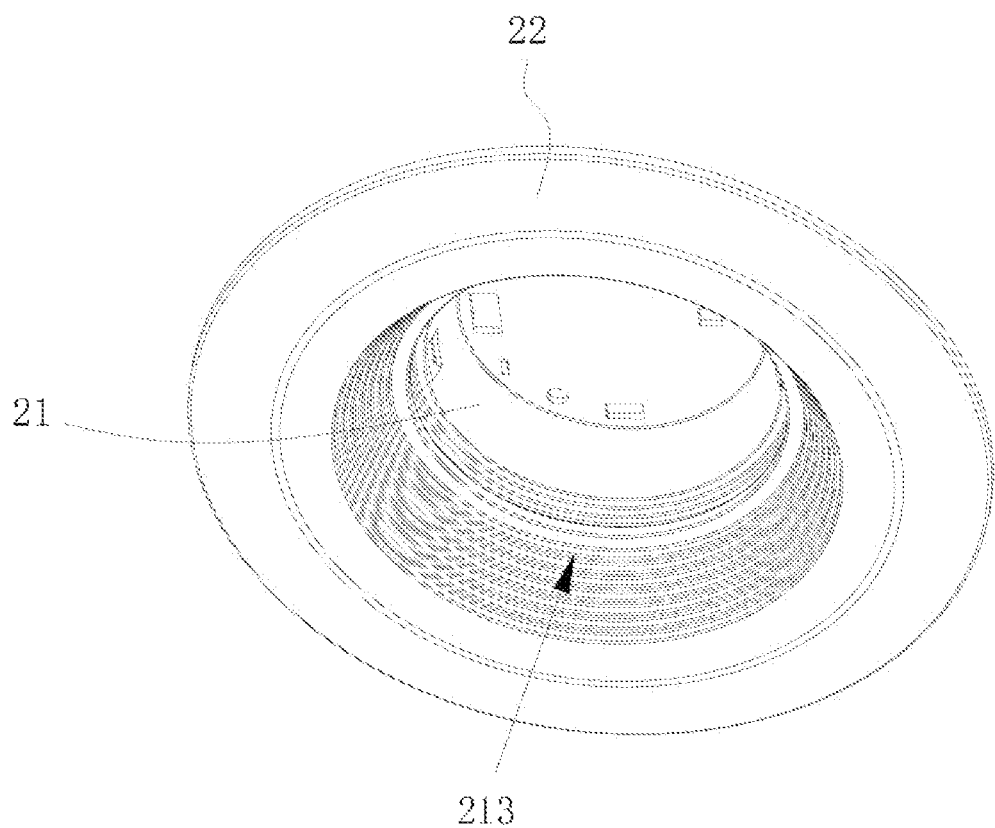
FIG. 10 illustrates another view of the downlight apparatus.

Please refer to FIG. 10, which illustrates an exploded view of the example in FIG. 9.

Reference numerals with the same values refer to the same components and are not repeated for brevity.

There is a socket 61 for connecting to the IDEAL connector head 91 for providing power to the driver 60 in the driver box. The elastic unit 80 has a connector end 81 and an elastic end 82 for fixing to the installation cavity or a junction box.

There is a water proof layer 100 with a ring shape for engaging a bottom side of a junction box, as explained above.

A ring cover 10 of the second light housing provides an entrance or an opening for passing the cup body 21 of the first light housing.

The second light source 50 is made as a ring shape for emitting light toward radial direction of a lateral wall of the second light housing.

There are hooks 12 for fixing to the first light housing. A light passing cover 30 is used for passing light of the second light source 50.

The second light housing 20 has a cup body 21 and a surface rim.

There is a container space 213 which forms a cone shape structure at a light opening 211 of the first light housing. The first light source has a reflector cup 41 forming a cup cavity 411. There is a light source plate 43 mounted with LED modules and other components. A light passing cover 43 may be replaced as a lens when necessary.

FIG. 3 shows another view of the example in FIG. 3. It is more clearly in FIG. 3 how the hook 12 of the second light housing is fixed to a positioning groove 214 of the first light housing.

Figure 4:
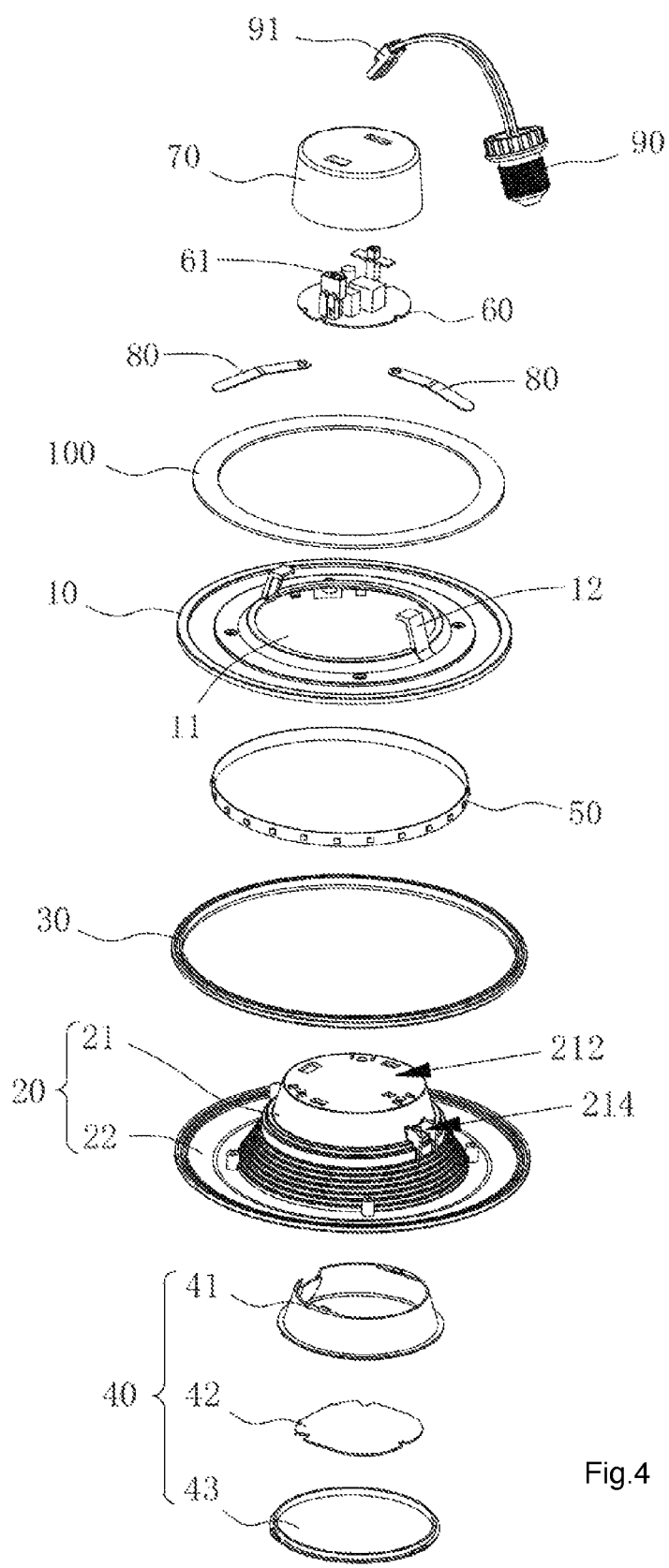
FIG. 4 illustrates another exploded view of the embodiment in FIG. 1.

FIG. 4 shows another view and components mentioned above are not repeated for brevity.

Figure 5:
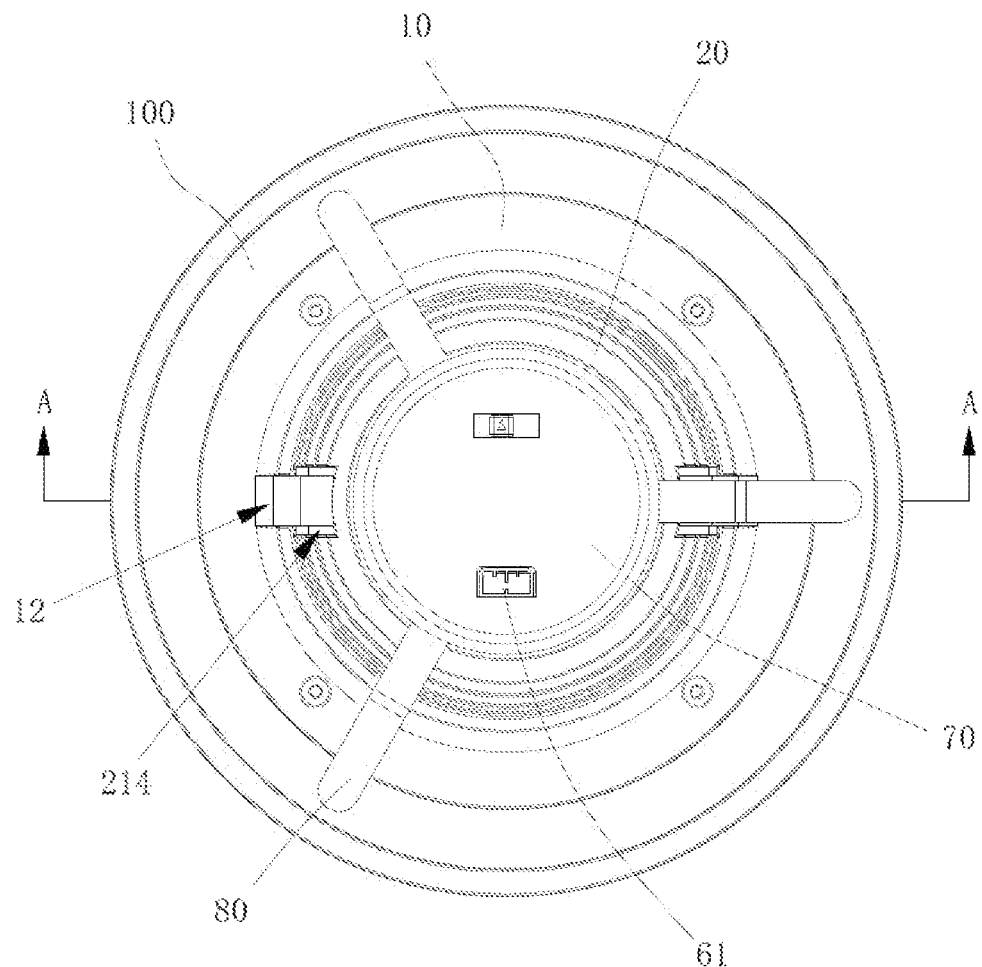
FIG. 5 illustrates a top view of the lighting apparatus embodiment.

FIG. 5 is a top view of the example. Components with the same reference numerals are not repeated again.

Figure 6:
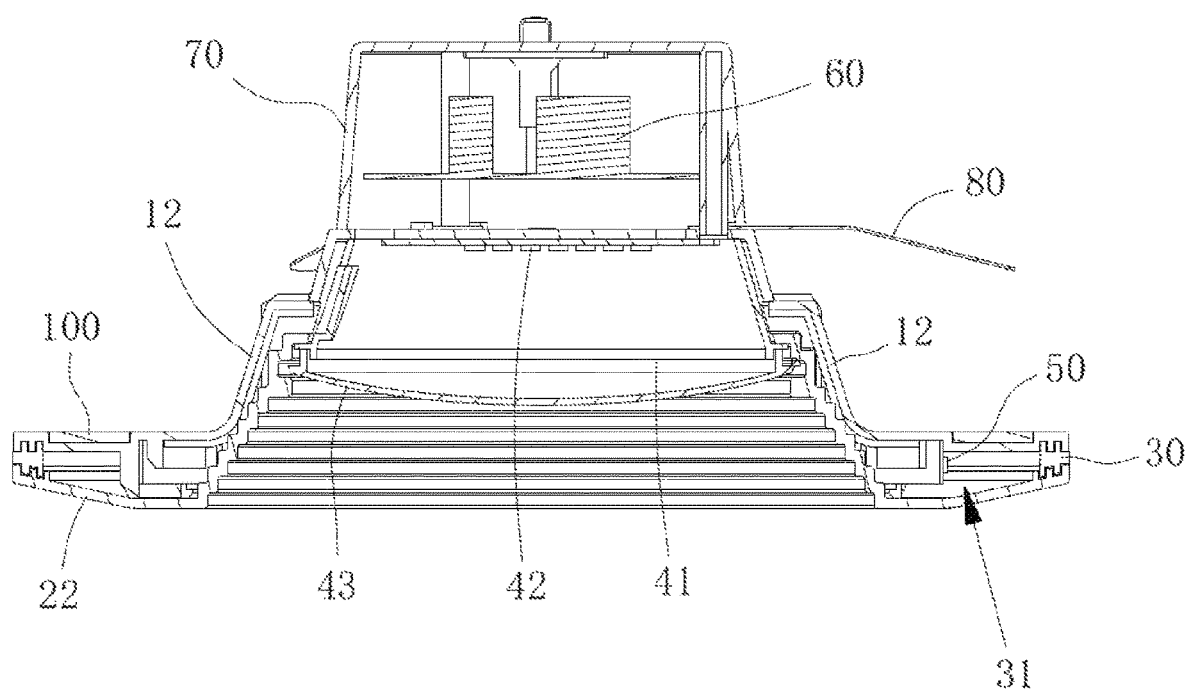
FIG. 6 illustrates a cross-sectional view of the lighting apparatus embodiment.
Figure 7:
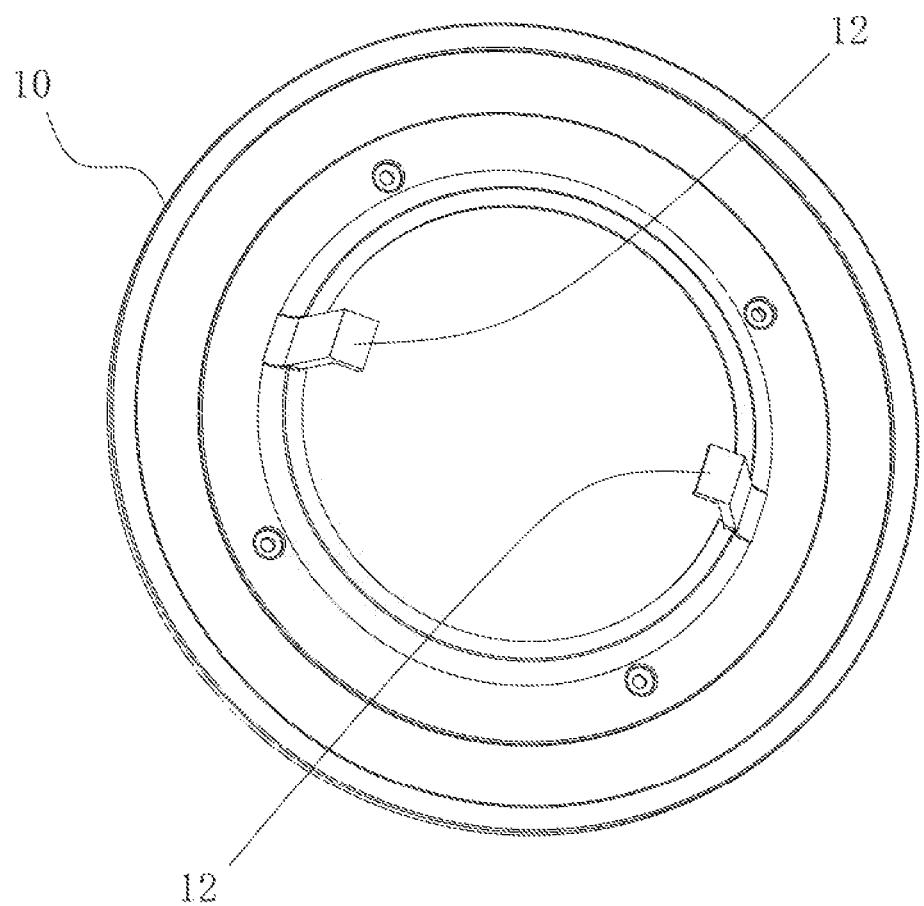
FIG. 7 illustrates a top view of the lighting apparatus embodiment.
Figure 8:
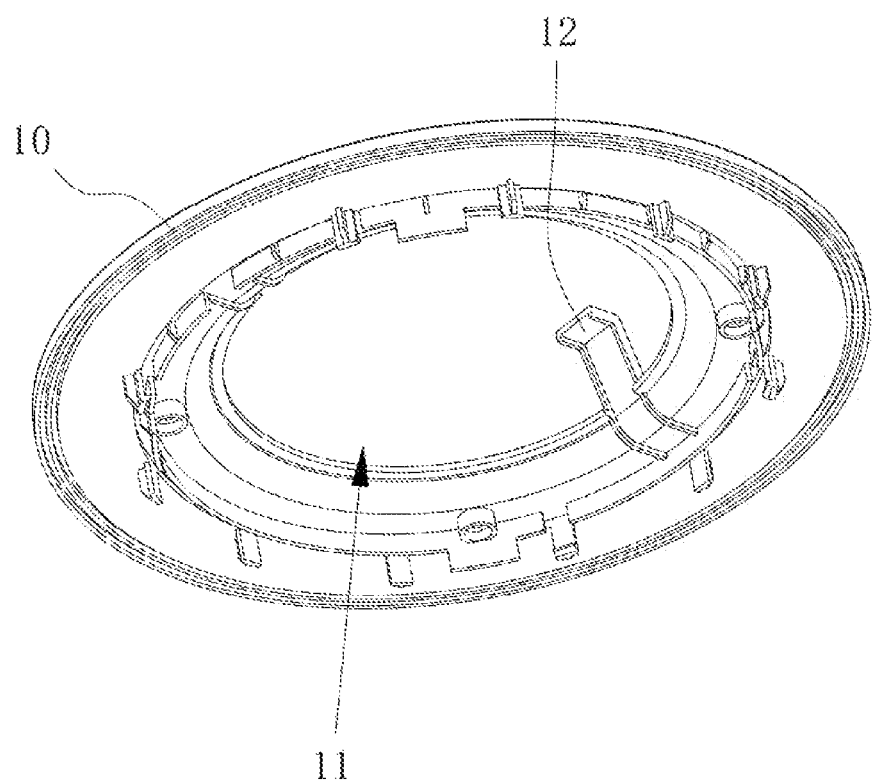
FIG. 8 illustrates another view of the lighting apparatus embodiment.

FIG. 6 shows a cross sectional view of the same example. The arrangement is more clearly found in such diagram.

FIG. 7, FIG. 8, FIG. 9 and FIG. 10 provide different views for the same example, too.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus comprising:
   a first light source;
   a first light housing for disposing the first light source to emit a first light from a first direction via a first light opening;
   a second light source; and
   a second light housing for disposing the second light source to emit a second light from a surrounding lateral wall of the second light housing, wherein an angle between the first light direction and a radial direction of the surrounding lateral wall is between 60 degrees to 150 degrees, an inner wall of the second housing is surrounding and fixed to a neck portion of the first light housing.

2. The lighting apparatus of claim 1, wherein the second light housing is fixed to an installation cavity and exposing an entrance to plug in the first light housing to fix the first light housing to the second light housing.

3. The lighting apparatus of claim 2, wherein the first light source receives a power supply from a connection to the second light housing.

4. The lighting apparatus of claim 1, wherein the first light housing has a cup structure and a surface rim, a bottom side of the second light housing is attached to an inner side of the surface rim, the neck portion is on a lateral surface of the cup structure, the first light source is disposed inside the cup structure.

5. The lighting apparatus of claim 4, wherein the second light housing comprises a ring cover, the ring cover and the inner side of the surface rim of the second light housing together form a container space for concealing the second light source.

6. The lighting apparatus of claim 4, wherein a driver container is disposed on a top cover of the cup structure, multiple elastic fixing units are disposed between the cup structure and the driver box for fixing the first light housing to an installation cavity.

7. The lighting apparatus of claim 6, wherein the driver container has a socket for plugging a plug head of a connector wire, the connector wire has an Edison cap for connecting to an Edison socket for routing an external power to a driver of the driver container.

8. The lighting apparatus of claim 6, wherein a junction box is placed inside the installation cavity, and the multiple elastic units engage an inner wall of the junction box.

9. The lighting apparatus of claim 8, wherein a bottom edge of the junction box is fixed to a top side of the second light housing.

10. The lighting apparatus of claim 9, wherein the top side of the second light housing has a water proof layer.

11. The lighting apparatus of claim 4, wherein there are multiple positioning grooves disposed on the neck portion of the first light housing, the second light housing has corresponding multiple hooks for fixing to the multiple positioning grooves to fix the second light housing to the first light housing.

12. The lighting apparatus of claim 1, wherein the second light projects an image pattern on a ceiling.

13. The lighting apparatus of claim 12, wherein the image pattern is a sky with stars.

14. The lighting apparatus of claim 1, wherein the second light housing is detachably connected to the first light housing with a plugging structure.

15. The lighting apparatus of claim 14, wherein the plugging structure provides a structure connection between the first light housing and the second light housing and provides an electrical connection of the second light source to a driver fixed to the first light housing.

16. The lighting apparatus of claim 15, wherein when the second light housing is detached from the first light housing, a speaker module having a similar structure as the second light housing is attached to the first light housing with the plugging structure.

17. The lighting apparatus of claim 1, wherein the second light source is controlled to deliver a visual message by a light pattern emitted by the second light source.

18. The lighting apparatus of claim 1, wherein the first light housing has a cone structure surrounding the first light source for diffusing the first light of the first light source.

19. The lighting apparatus of claim 18, wherein the first light source has a condensing lens for condensing the first light of the first light source.

20. The lighting apparatus of claim 1, wherein there are multiple connection angles between the first light housing and the second light housing, each connection angle corresponding to a different setting for controlling the first light source and the second light source.

* * * * *